United States Patent
Kim et al.

(10) Patent No.: US 10,854,391 B2
(45) Date of Patent: Dec. 1, 2020

(54) MULTILAYER CAPACITOR

(71) Applicant: SAMSUNG ELECTRO-MECHANICS CO., LTD., Suwon-si (KR)

(72) Inventors: Je Jung Kim, Suwon-si (KR); Do Young Jeong, Suwon-si (KR); Do Yeon Kim, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 11 days.

(21) Appl. No.: 16/272,066

(22) Filed: Feb. 11, 2019

(65) Prior Publication Data

US 2020/0043663 A1    Feb. 6, 2020

(30) Foreign Application Priority Data

Aug. 1, 2018    (KR) .................. 10-2018-0089657

(51) Int. Cl.
*H01G 4/30* (2006.01)
*H01G 4/232* (2006.01)
(Continued)

(52) U.S. Cl.
CPC .............. *H01G 4/30* (2013.01); *H01G 4/012* (2013.01); *H01G 4/12* (2013.01); *H01G 4/232* (2013.01)

(58) Field of Classification Search
CPC ............ H01G 4/12; H01G 2/065; H01G 2/24; H01G 4/0085; H01G 4/012; H01G 4/33;
(Continued)

(56) References Cited

U.S. PATENT DOCUMENTS

2014/0240895 A1* 8/2014 Lee .................. H01G 4/12
                                                        361/301.4
2016/0099105 A1   4/2016 Lee et al.
(Continued)

FOREIGN PATENT DOCUMENTS

JP        2016-146469 A    8/2016
KR   10-2014-0106021 A    9/2014
(Continued)

OTHER PUBLICATIONS

Office Action issued in corresponding Korean Application No. 10-2018-0089657 dated Jul. 19, 2019, with English translation.

*Primary Examiner* — Michael P McFadden
(74) *Attorney, Agent, or Firm* — Morgan, Lewis & Bockius LLP (57) ABSTRACT

A multilayer capacitor includes a capacitor body including an active region, and upper and lower cover regions disposed on upper and lower portions of the active region, respectively. First and second external electrode are disposed on both ends of the capacitor body, respectively. The active region includes a plurality of first dielectric layers, first and second internal electrodes alternately disposed with the first dielectric layer interposed therebetween, and first and second auxiliary electrodes disposed on the first dielectric layers on which the first and second internal electrodes are disposed, respectively. The upper and lower cover regions each include a plurality of second dielectric layers having a thickness less than that of each of the first dielectric layers, and a dummy electrode disposed on the second dielectric layers.

12 Claims, 4 Drawing Sheets

(51) Int. Cl.
*H01G 4/12* (2006.01)
*H01G 4/012* (2006.01)

(58) Field of Classification Search
CPC ............ H01G 4/232; H01G 4/30; H01G 4/20; H01G 4/2325; H01G 4/306
See application file for complete search history.

(56) References Cited

U.S. PATENT DOCUMENTS

2016/0111216 A1* 4/2016 Lee .................. H01G 4/232
                                                361/301.4
2016/0227650 A1   8/2016 Teraoka
2018/0182551 A1   6/2018 Ahn et al.
2018/0197682 A1*  7/2018 Yamada ................ H01G 4/30

FOREIGN PATENT DOCUMENTS

| KR | 10-2016-0040845 A | 4/2016 |
| KR | 10-2017-0024750 A | 3/2017 |
| KR | 10-2018-0073083 A | 7/2018 |

\* cited by examiner

MULTILAYER CAPACITOR

CROSS-REFERENCE TO RELATED APPLICATION

This application claims the benefit of priority under 35 U.S.C. § 119(a) of Korean Patent Application No. 10-2018-0089657 filed on Aug. 1, 2018 in the Korean Intellectual Property Office, the entire disclosure of which is incorporated herein by reference for all purposes.

BACKGROUND

1. Field

The following description relates to a multilayer capacitor.

2. Description of Related Art

Multilayer capacitors have positive characteristics in terms of miniaturization and implementing high capacity, while having ease of mounting. Thus, multilayer capacitors may be mounted on the circuit boards of various types of electronic products, including display devices such as liquid crystal displays (LCD), plasma display panels (PDP) or the like, computers, smartphones and mobile phones, serving to charge or discharge electricity.

In addition, as industry interest in electric components has increased, multilayer capacitors having high reliability and high strength properties for use in automotive or infotainment systems have been demanded.

In recent years, since high flexural strength characteristics are required for chip components, a new method of improving flexural strength characteristics of a multilayer capacitor is required.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a multilayer capacitor having improved bending strength characteristics.

According to an aspect there is disclosed a multilayer capacitor including a capacitor body including an active region, and upper and lower cover regions disposed on upper and lower portions of the active region, respectively. A first external electrode and a second external electrode are disposed on opposite ends of the capacitor body, respectively. The active region includes a plurality of first dielectric layers, first internal electrodes and second internal electrodes alternately disposed with the respective first dielectric layers interposed therebetween, and first auxiliary electrodes and second auxiliary electrodes disposed on the first dielectric layers on which the first and second internal electrodes are disposed, respectively. The upper and lower cover regions each include a plurality of second dielectric layers having a thickness less than a thickness of each of the first dielectric layers, and dummy electrodes disposed on the second dielectric layers.

The thickness of the second dielectric layers may be equal to 20% to 60% of the thickness of the first dielectric layers.

A thickness of each of the upper and lower cover regions may be 100 μm or more.

The upper cover region may further include an upper margin portion disposed on an upper surface of an uppermost dummy electrode, including a plurality of dielectric layers, and free of any electrodes therebetween, and the lower cover region may further include a lower margin portion disposed on a lower surface of a lowermost dummy electrode, including a plurality of dielectric layers, and free of any electrodes therebetween.

A length of each of the first and second internal electrodes may be greater than a length of each of the first and second auxiliary electrodes.

The capacitor body may include a first surface and a second surface opposing each other, a third surface and a fourth surface connecting the first and second surfaces and opposing each other, and a fifth surface and a sixth surface connecting the first and second surfaces, connecting the third and fourth surfaces, and opposing each other, one ends of the first and second internal electrodes may be exposed through the third and fourth surfaces, respectively, one ends of the first and second auxiliary electrodes may be exposed through the fourth and third surfaces, respectively, and the dummy electrode may be provided as two dummy electrodes spaced apart from each other on a single second dielectric layer, one ends of the two dummy electrodes being exposed through the third and fourth surfaces, respectively.

The dummy electrode may include a first dummy electrode and a second dummy electrode spaced apart from each other on the second dielectric layer of the upper cover region, one ends of the first and second dummy electrodes being exposed through the third and fourth surfaces, respectively, and a third dummy electrode and a fourth dummy electrode spaced apart from each other on the second dielectric layer of the lower cover region, one ends of the third and fourth dummy electrodes being exposed through the third and fourth surfaces, respectively; and lengths of the first dummy electrode and the fourth dummy electrode may be the same as lengths of the first internal electrode and the second internal electrode, respectively, and lengths of the second dummy electrode and the third dummy electrode may be the same as lengths of the first auxiliary electrode and the second auxiliary electrode, respectively.

In the upper cover region, the first dummy electrode and the second dummy electrode may be provided as a plurality of first dummy electrodes and second dummy electrodes disposed on and below the second dielectric layer interposed therebetween, and in the lower cover region, the third dummy electrode and the fourth dummy electrode may be provided as a plurality of third dummy electrodes and fourth dummy electrodes disposed on and below the second dielectric layer interposed therebetween.

The dummy electrode may include a first dummy electrode and a second dummy electrode spaced apart from each other on the second dielectric layer of the upper cover region, one ends of the first and second dummy electrodes being exposed through the third and fourth surfaces, respectively, and a third dummy electrode and a fourth dummy electrode spaced apart from each other on the second dielectric layer of the lower cover region, one ends of the third and fourth dummy electrodes being exposed through the third and fourth surfaces, respectively; and the first, second, third and fourth dummy electrodes may have the same length.

In the upper cover region, the first dummy electrode and the second dummy electrode may be provided as a plurality of first dummy electrodes and second dummy electrodes disposed on and below the second dielectric layer interposed therebetween, and in the lower cover region, the third dummy electrode and the fourth dummy electrode may be provided as a plurality of third dummy electrodes and fourth dummy electrodes disposed on and below the second dielectric layer interposed therebetween.

Lengths of the first, second, third, and fourth dummy electrodes may be greater than lengths of the first and second auxiliary electrodes.

In accordance with a further aspect of the disclosure, a multilayer capacitor includes a body including a plurality of first dielectric layers, first and second internal electrodes alternately stacked with each other and having the first dielectric layers interposed therebetween, and upper and lower cover portions each including a plurality of second dielectric layers and respectively disposed above the uppermost internal electrode and below the lowermost internal electrode of the first and second internal electrodes. First and second external electrodes are disposed on one or more external surfaces of the body and respectively connected to the first and second internal electrodes. The second dielectric layers of the upper and lower cover portions each have a thickness less than a thickness of each of the first dielectric layers.

The second dielectric layers of the upper and lower cover portions may each have the thickness of between 20% and 60% of the thickness of the first dielectric layers.

The upper and lower cover portions may each include, on each second dielectric layer of the plurality of second dielectric layers, first and second dummy electrodes respectively connected to the first and second external electrodes and spaced apart from other first and second dummy electrodes by second dielectric layers of the plurality of second dielectric layers.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining an understanding of the disclosure of this application. For example, the sequences of operations described herein are merely examples, and are not limited to those set forth herein, but may be changed as will be apparent after gaining an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have merely been provided to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

The terminology used herein is for describing various examples only, and is not to be used to limit the disclosure. As used herein, the term "and/or" includes anyone and any combination of any two or more of the associated listed items. The articles "a," "an," and "the" are intended to include the plural forms as well, unless the context clearly indicates otherwise.

The use of the term "may" with respect to an example or embodiment, e.g., as to what an example or embodiment may include or implement, means that at least one example or embodiment exists in which such a feature is included or implemented while all examples and embodiments are not limited thereto.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's positional relationship relative to another element in the orientation shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

Due to manufacturing techniques and/or tolerances, variations of the shapes shown in the drawings may occur. Thus, the examples described herein are not limited to the specific shapes shown in the drawings, but include changes in shape that occur during manufacturing.

Hereinafter, when the direction of a capacitor body 110 is defined to clearly explain examples in the present disclosure, X, Y, and Z shown in the drawings represent the length direction, the width direction, and the thickness direction of the capacitor body 110, respectively. Further, in examples described below, the Z direction may be used in the same concept as the lamination direction in which dielectric layers are stacked and laminated.

Figure 1:
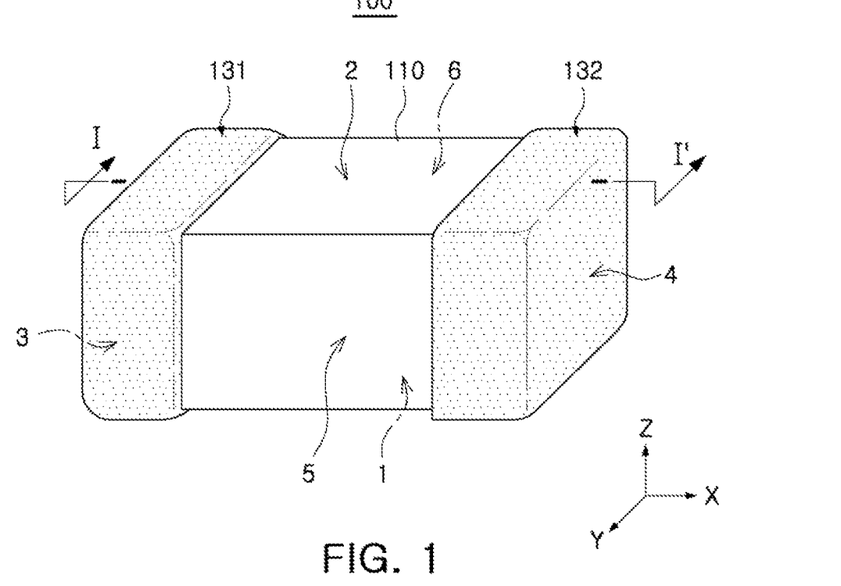
FIG. 1 is a perspective view illustrating an example of a multilayer capacitor.
Figure 2:
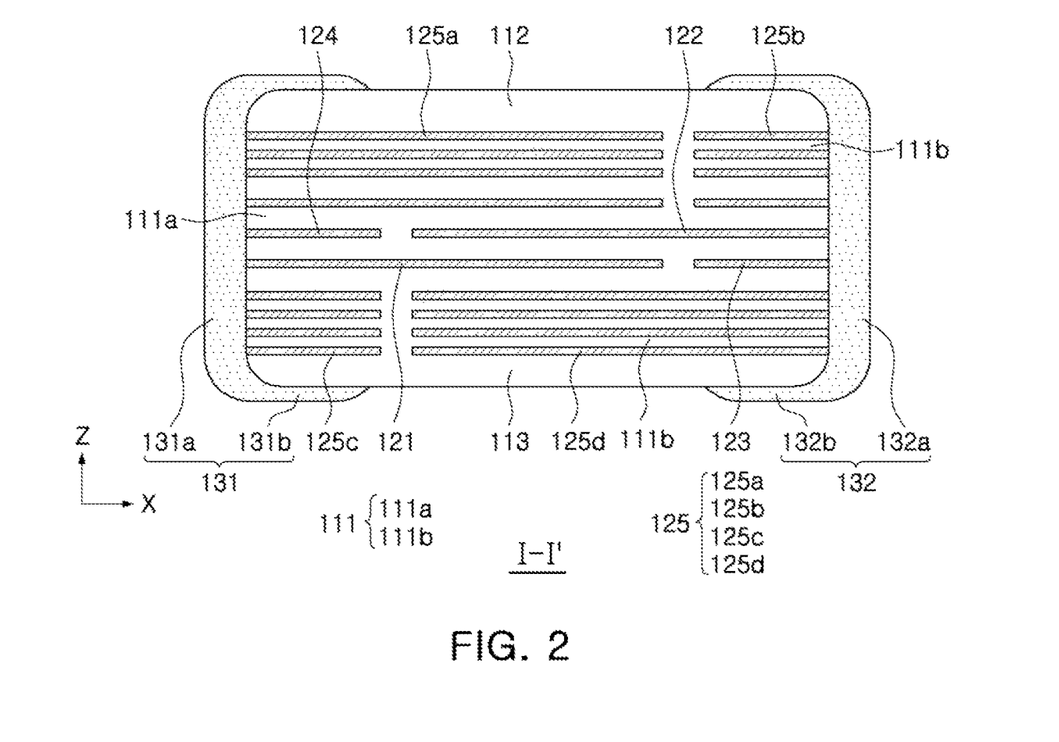
FIG. 2 is a cross-sectional view taken along line I-I' in FIG. 1.

FIG. 1 is a perspective view illustrating an example of a multilayer capacitor. FIG. 2 is a cross-sectional view taken along line I-I' in FIG. 1. FIGS. 3A to 3D are plan views illustrating first and second internal electrodes, first and second auxiliary electrodes, and dummy electrodes included in a capacitor body of FIG. 1.

Referring to FIGS. 1, 2, and 3A to 3D, a multilayer capacitor 100 according to an example includes a capacitor body 110, first and second external electrodes 131 and 132 disposed on opposing ends of the capacitor body 110 in an X direction, first and second auxiliary electrodes 123 and 124, and dummy electrodes 125.

The capacitor body 110 is formed by laminating and sintering a plurality of dielectric layers 111 in a Z direction. In this case, the plurality of dielectric layers 111 forming the capacitor body 110 are in a sintered state, and may be integrated such that it may be difficult to confirm a boundary between adjacent dielectric layers 111 without using a scanning electron microscope (SEM).

In this case, the capacitor body 110 may have a generally hexahedral shape, but the shape of the capacitor body is not limited thereto. The shape and dimension of the capacitor body 110 and the number of laminated layers of the dielectric layers 111 are not limited to those shown in the drawings.

In this example, for convenience of explanation, two surfaces of the capacitor body 110 opposing each other in the Z direction are referred to as first and second surfaces 1 and 2, two surfaces of the capacitor body 110 connecting the first and second surfaces 1 and 2 and opposing each other in an X direction are referred to as third and fourth surfaces 3 and 4, and two surfaces thereof connecting the first and second surfaces and opposing each other in a Y direction are referred to as fifth and sixth surfaces 5 and 6. In this example, the first surface 1 may be a surface in a mounting direction.

The dielectric layer 111 may include a ceramic material having a high dielectric constant, for example, a barium titanate ($BaTiO_3$)-based or strontium titanate ($SrTiO_3$)-based ceramic powder, or the like, but the ceramic material is not limited thereto. For example, any ceramic material may be used as long as sufficient capacitance may be obtained therefrom.

A ceramic additive, an organic solvent, a plasticizer, a binder, a dispersant may further be added to the dielectric layer 111, together with the ceramic powder.

The ceramic additive may be, for example, a transition metal oxide or a transition metal carbide, a rare earth element, magnesium (Mg), aluminum (Al), or the like.

The capacitor body 110 may be configured to include an active region serving as a portion contributing to capacitance formation of a capacitor, and upper and lower cover regions 112 and 113 formed on upper and lower portions of the active region in the Z direction, respectively.

The active region includes a plurality of first and second internal electrodes 121 and 122 and the first and second auxiliary electrodes 123 and 124, disposed alternately with the dielectric layer 111 interposed therebetween.

One end of each of the first and second internal electrodes 121 and 122 is exposed through a respective one of the third and fourth surfaces 3 and 4 of the capacitor body 110, and one end of each of the first and second auxiliary electrodes 123 and 124 is exposed through a respective one of the fourth and third surfaces 4 and 3 of the capacitor body 110.

The first and second internal electrodes 121 and 122 are electrodes having different polarities and are formed by printing a conductive paste, containing a conductive metal, to a predetermined thickness on first dielectric layer(s) 111a, and may be electrically insulated from each other by the first dielectric layer(s) 111a interposed therebetween.

The conductive metal may be one of, for example, silver (Ag), palladium (Pd), platinum (Pt), nickel (Ni), and copper (Cu), or alloys thereof, but is not limited thereto.

The conductive paste may be printed by a screen printing method, a gravure printing method, or the like, but an example thereof is not limited thereto.

The first and second internal electrodes 121 and 122 are in contact with the first and second external electrodes 131 and 132 through portions of the first and second internal electrodes 121 and 122 that are alternately exposed through the third and fourth surfaces 3 and 4 of the capacitor body 110, to be electrically connected thereto, respectively Thus, when a voltage is applied to the first and second external electrodes 131 and 132, charges are accumulated between the first and second internal electrodes 121 and 122.

In this case, capacitance of the multilayer capacitor 100 is proportional to an area of overlap of the first and second internal electrodes 121 and 122 overlapping each other in the Z direction in the active region.

Lengths of the first and second internal electrodes 121 and 122 may be greater than lengths of the first and second auxiliary electrodes 123 and 124, respectively, to implement a capacity. Lengths of the first and second internal electrodes 121 and 122 may be measured in a length direction (X direction) of the capacitor body 110.

Figure 3A:
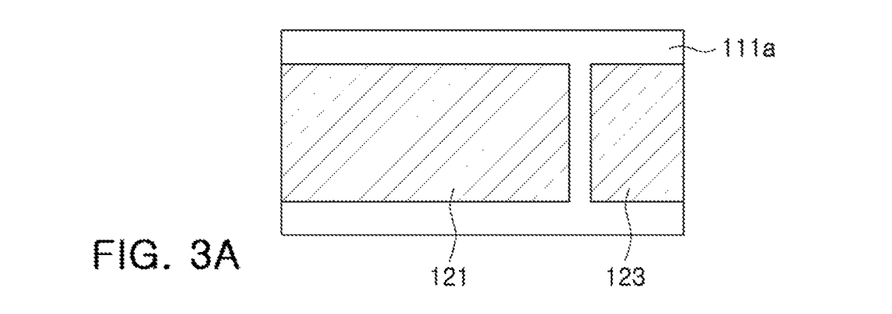
FIGS. 3A to 3D are plan views illustrating first and second internal electrodes, first and second auxiliary electrodes, and dummy electrodes included in a capacitor body of FIG. 1.

The first auxiliary electrode 123 is disposed together with the first internal electrode 121, on the first dielectric layer 111a on which the first internal electrode 121 is disposed, to be spaced apart therefrom, and one end of the first auxiliary electrode 123 is exposed to the fourth surface 4 of the capacitor body 110.

Figure 3B:
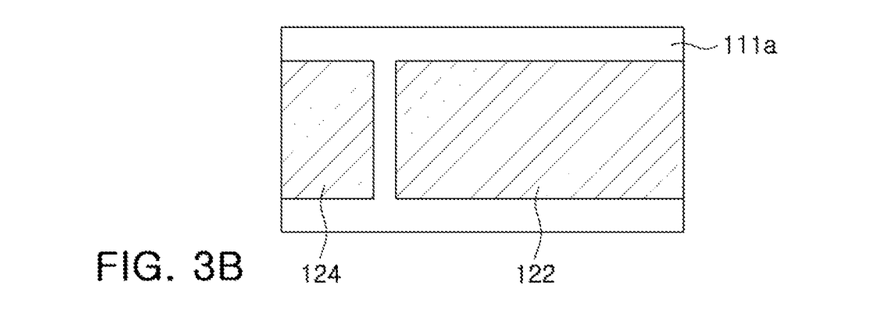

The second auxiliary electrode 124 is disposed together with the second internal electrode 122, on the first dielectric layer 111a on which the second internal electrode 122 is disposed, to be spaced apart therefrom, and one end of the second auxiliary electrode 124 is exposed to the third surface 3 of the capacitor body 110.

The inclusion of first and second auxiliary electrodes 123 and 124 in the capacitor body 110 may improve bending strength.

The upper and lower cover regions 112 and 113 are formed by laminating two or more second dielectric layers 111b on each of upper and lower surfaces of the active region in the Z direction, and include a dummy electrode 125 disposed on the second dielectric layer 111b.

In this case, a thickness of each of the upper and lower cover regions 112 and 113 may be 100 μm or more. If the thickness of each of the upper and lower cover regions 112 and 113 is less than 100 μm, the second dielectric layers 111b constituting the upper and lower cover regions 112 and 113 may be damaged even before stress is applied to the active region.

The second dielectric layers 111b may be formed of the same material as that of the first dielectric layer 111a and may each have a thickness less than that of the first dielectric layer 111a.

In this case, the thicknesses of the second dielectric layers 111b may each range from 20 to 60% of the thickness of the first dielectric layer 111a.

In the case of the dummy electrode 125, two dummy electrodes are disposed on a single second dielectric layer 111b to be spaced apart from each other, and ends of the dummy electrodes are exposed through the third and fourth surfaces 3 and 4 of the capacitor body 110.

The dummy electrode 125 may improve bending strength and improve electrical connection with the external electrodes.

Figure 3C:
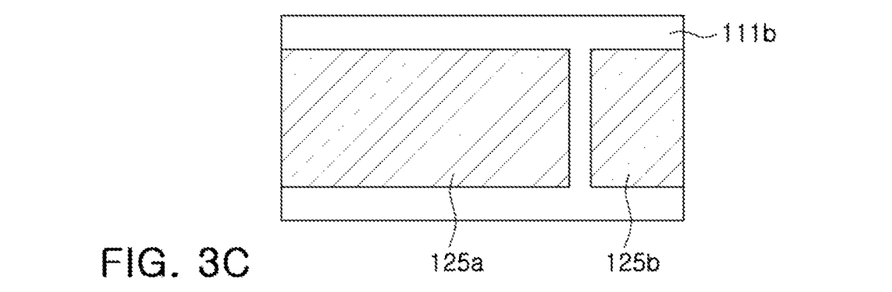
Figure 3D:
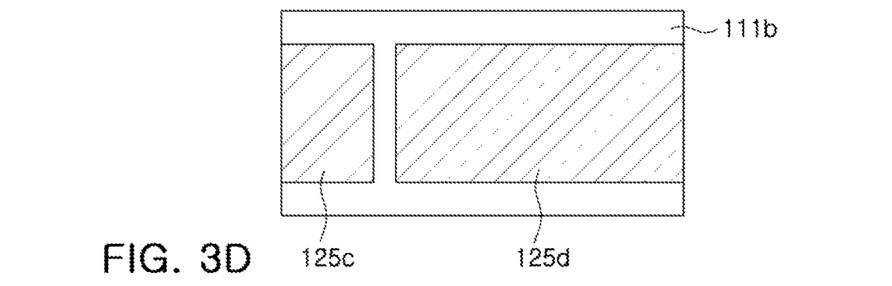

In this example, the dummy electrode 125 may include first, second, third and fourth dummy electrodes 125a, 125b, 125c, and 125d.

In the upper cover region 112, a plurality of first dummy electrodes 125a and second dummy electrodes 125b are disposed with the second dielectric layer 111b interposed therebetween in the Z direction. In the lower cover region 113, a plurality of third dummy electrodes 125c and fourth dummy electrodes 125d are disposed with the second dielectric layer 111b interposed therebetween in the Z direction.

In detail, the first dummy electrode 125a is disposed on the second dielectric layer 111b of the upper cover region 112, and one end thereof is exposed through the third surface 3 of the capacitor body 110. In this case, a length of the first dummy electrode 125a is the same as a length of the first internal electrode 121.

The second dummy electrode 125b is disposed on the second dielectric layer 111b of the upper cover region 112 to be spaced apart from the first dummy electrode 125a, and one end of the second dummy electrode 125b is exposed through the fourth surface 4 of the capacitor body 110. In this case, a length of the second dummy electrode 125b may be the same as a length of the first auxiliary electrode 123.

The third dummy electrode 125c is disposed on the second dielectric layer 111b of the lower cover region 113, and one end thereof is exposed through the third surface 3 of the capacitor body 110. In this case, a length of the third dummy electrode 125c may be the same as a length of the second auxiliary electrode 124.

The fourth dummy electrode 125d is disposed on the second dielectric layer 111b of the lower cover region 113 to be spaced apart from the third dummy electrode 125c, and one end of the fourth dummy electrode 125d is exposed through the fourth surface 4 of the capacitor body 110. In this case, a length of the fourth dummy electrode 125d is the same as a length of the second internal electrode 122.

The upper cover region 112 further includes an upper margin portion without any electrode(s) disposed above an upper surface of an uppermost dummy electrode in the Z direction, and the lower cover region 113 further includes a lower margin portion without any electrode (s) disposed below a lower surface of a lowermost dummy electrode.

The upper and lower margin portions may basically prevent damage to the first and second internal electrodes 121 and 122 due to physical or chemical stress.

The first and second external electrodes 131 and 132 are provided with voltages of different polarities and are electrically connected to exposed portions of the first and second internal electrodes 121 and 122, respectively.

In this case, exposed portions of the second auxiliary electrode 124, the first dummy electrode 125a, and the third dummy electrode 125c are connected to the first external electrode 131.

In addition, exposed portions of the first auxiliary electrode 123, the second dummy electrode 125b, and the fourth dummy electrode 125d are connected to the second external electrode 132.

A plating layer may be formed on surfaces of the first and second external electrodes 131 and 132 as required.

For example, the first and second external electrodes 131 and 132 may include first and second conductive layers connected to the internal electrodes or the dummy electrodes, first and second nickel (Ni) plating layers formed on the first and second conductive layers, and first and second tin (Sn) plating layers formed on the first and second nickel plating layers, respectively.

The first external electrode 131 may include a first connection portion 131a and a first band portion 131b.

The first connection portion 131a is formed on the third surface 3 of the capacitor body 110 to be connected to (e.g., in contact with) the first internal electrode 121, the second auxiliary electrode 124, the first dummy electrode 125a, and the third dummy electrode 125c, and the first band portion 131b extends from the first connection portion 131a to portions of the first, second, fifth, and sixth surfaces 1, 2, 5, and 6 of the capacitor body 110.

The second external electrode 132 may include a second connection portion 132a and a second band portion 132b.

The second connection portion 132a is formed on the fourth surface 4 of the capacitor body 110 to be connected to (e.g., in contact with) the second internal electrode 122, the first auxiliary electrode 123, the second dummy electrode 125b, and the fourth dummy electrode 125d, and the second band portion 132b extends from the second connection portion 132a to portions of the first, second, fifth, and sixth surfaces 1, 2, 5, and 6 of the capacitor body 110.

In a multilayer capacitor, bending strength characteristics are proportional to the number of laminated layers of the dielectric layer on which the internal electrode is printed.

Using such characteristics, the number of layers to secure bending strength characteristics may be reinforced by inserting dielectric layers, printed with dummy electrodes irrelevant to capacity implementation, into the upper and lower cover regions of the capacitor body.

However, in the case of a multilayer capacitor according to the related art, since dielectric layers in an active region in which internal electrodes are printed and dielectric layers in a cover region in which dummy electrodes are printed have substantially the same thickness, it is difficult to secure a sufficient number of layers in a limited chip size.

For example, in the related art, if a thickness of a cover region is 200 μm, only 10 layers may be laminated when 20 μm thick dummy electrodes are laminated, while 20 layers may be laminated in the case in which dummy electrodes have a thickness of 10 μm.

To secure the same bending strength, if 20 layers of dummy electrodes having a thickness of 20 μm are laminated, the size of a multilayer capacitor is relatively exceeded.

Thus, according to an example in the present disclosure, the second dielectric layer (e.g., 111b), on which the dummy electrodes are disposed, are disposed in the upper and lower cover regions, and the thickness of the second dielectric layer (e.g., 111b) is formed to be less than the thickness of the first dielectric layer (e.g., 111a) on which the internal electrodes of the active region are disposed. As described above, relatively more dielectric layers on which the dummy electrodes are formed may be disposed in the upper and lower cover regions in a limited chip size having the same number of laminated layers in the active regions.

Thus, the bending strength characteristics of the multilayer capacitor may be improved without changing an overall chip size.

Experimental Example

Table 1 shows test results with respect to the frequency of the occurrence of bending cracks depending on a thickness ratio of a second dielectric layer and a first dielectric layer.

In this case, a multilayer capacitor was manufactured in such a manner that a capacitor body of the multilayer capacitor for each sample had a structure of internal electrodes and dummy electrodes as shown in FIG. 2, and the multilayer capacitor had a length of 32 mm and a width of 16 mm with electrical characteristics of 2.2 uF.

The frequency of the occurrence of bending cracks was measured, by locating a chip mounted on a substrate in a device capable of applying pressure to a mounting surface of the chip, and by applying pressure downwardly on a surface of the chip opposite to the mounting surface to cause deflections of 4 mm, 5 mm, 6 mm, 7 mm and 8 mm, as shown in Table 1, until a current value is increased to determine whether or not bending cracking occurs.

TABLE 1

| # | Second dielectric layer/First dielectric layer (Thickness ratio) | Frequency of Occurrence of Bending Cracks | | | | |
|---|---|---|---|---|---|---|
| | | 4 mm | 5 mm | 6 mm | 7 mm | 8 mm |
| 1 | 20% | 0/60 | 0/60 | 0/60 | 0/60 | 0/60 |
| 2 | 30% | 0/60 | 0/60 | 0/60 | 0/60 | 0/60 |
| 3 | 40% | 0/60 | 0/60 | 0/60 | 0/60 | 0/60 |
| 4 | 60% | 0/60 | 0/60 | 0/60 | 0/60 | 0/60 |
| 5 | 70% | 0/60 | 1/60 | 1/60 | 0/60 | 1/60 |
| 6 | 80% | 0/60 | 1/60 | 0/60 | 3/60 | 4/60 |
| 7 | 100% | 1/60 | 1/60 | 3/60 | 4/60 | 7/60 |

Referring to Table 1, it can be confirmed that in the case of Samples 1, 2, 3 and 4 in which a thickness ratio of the second dielectric layer to the first dielectric layer is 60% or less, no bending cracks occur in the test of applying pressure, performed to cause deflections of 4 mm to 8 mm.

Thus, it can be seen that the thickness ratio of the second dielectric layer to the first dielectric layer is preferably set to 60% or less.

Figure 4:
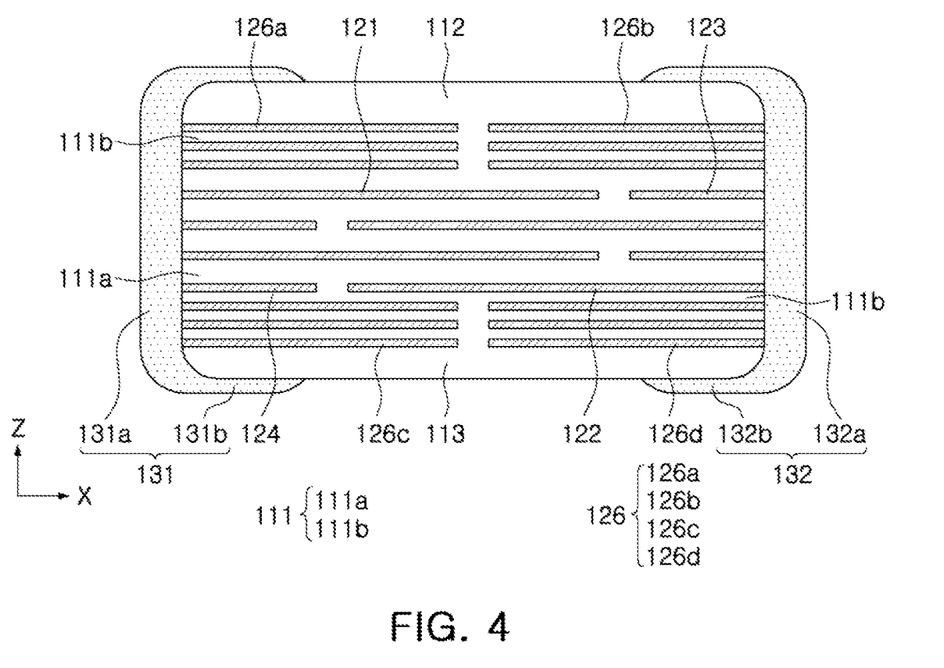
FIG. 4 is a cross-sectional view illustrating another example of a multilayer capacitor.
Figure 5A:
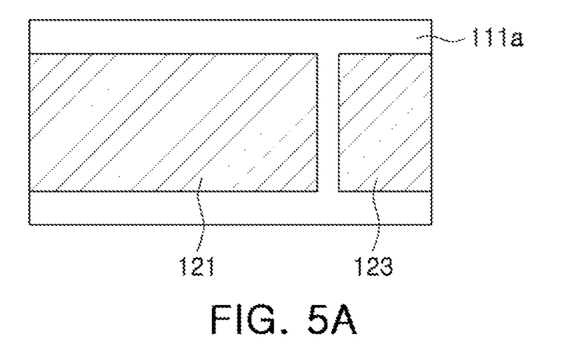
FIGS. 5A to 5C are plan views illustrating first and second internal electrodes, first and second auxiliary electrodes, and dummy electrodes included in a capacitor body of FIG. 4.
Figure 5B:
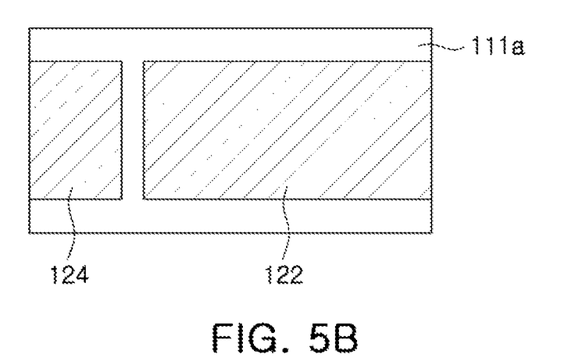
Figure 5C:
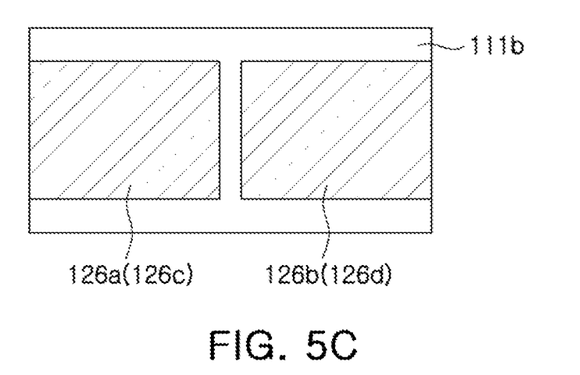

FIG. 4 is a cross-sectional view illustrating another example of a multilayer capacitor. FIGS. 5A to 5C are plan views illustrating first and second internal electrodes and first to third dummy electrodes included in a capacitor body of FIG. 4. In this case, the structures of the first and second internal electrodes, first and second auxiliary electrodes, first and second external electrodes, a first dielectric layer, and a second dielectric layer are the same as those in the foregoing example, and a detailed description thereof will be omitted to avoid redundancy.

Referring to FIGS. 4 and 5A-5C, a dummy electrode 126 in an example includes first, second, third and fourth dummy electrodes 126a, 126b, 126c and 126d.

In an upper cover region 112, a plurality of first dummy electrodes 126a and second dummy electrodes 126b are disposed with a second dielectric layer 111b interposed therebetween in a Z direction, and in a lower cover region 113, a plurality of third dummy electrodes 126c and fourth dummy electrodes 126d are disposed with the second dielectric layer 111b interposed therebetween in the Z direction.

In more detail, the first dummy electrode 126a and the second dummy electrode 126b are disposed on the second dielectric layer 111b of the upper cover region 112, and one end of each of the first dummy electrode 126a and the second dummy electrode 126b is exposed through a respective one of the third and fourth surfaces 3 and 4 of the capacitor body 110. In this case, lengths of the first dummy electrode 126a and the second dummy electrode 126b may be the same as each other.

The third dummy electrode 126c and the fourth dummy electrode 126d are disposed on the second dielectric layer 111b of the lower cover region 113, and one end of each of the third dummy electrode 126c and the fourth dummy electrode 126d is exposed through a respective one of the third and fourth surfaces 3 and 4 of the capacitor body 110. In this case, lengths of the third dummy electrode 126c and the fourth dummy electrode 126d may be the same as each other.

For example, the first, second, third and fourth dummy electrodes 126a, 126b, 126c, and 126d constituting the third dummy electrode 126 may have the same length as each other.

The lengths of the first, second, third and fourth dummy electrodes 126a, 126b, 126c, and 126d may all be respectively smaller than the lengths of the first and second internal electrodes 121 and 122.

The lengths of the first, second, third, and fourth dummy electrodes 126a, 126b, 126c and 126d may all be respectively greater than the lengths of the first and second auxiliary electrodes 123 and 124.

As set forth above, bending strength characteristics of the multilayer capacitor disclosed herein may be improved.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects of the present disclosure in each example are to be considered as being applicable to similar features or aspects of the present disclosure in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but more generally includes the scope defined by the claims and their equivalents, and all variations within the scope of the claims and their equivalents are to be construed as being included in the disclosure.

What is claimed is:

1. A multilayer capacitor comprising: a capacitor body including an active region, and upper and lower cover regions respectively disposed on upper and lower portions of the active region opposing each other in a stacking direction, and a first external electrode and a second external electrode disposed on opposite third and fourth surfaces of the capacitor body, respectively, wherein the active region includes a plurality of first dielectric layers, first internal electrodes and second internal electrodes respectively connected to the first and second external electrodes and alternately disposed to overlap each other in the stacking direction with the respective first dielectric layers interposed therebetween, and first auxiliary electrodes and second auxiliary electrodes disposed on the first dielectric layers on which the first and second internal electrodes are disposed, respectively, the upper and lower cover regions each include a plurality of second dielectric layers each having a thickness less than a thickness of each of the first dielectric layers, and first and second dummy electrodes are disposed to be spaced apart from each other on a second dielectric layer of the upper cover region, and third and fourth dummy electrodes are disposed to be spaced apart from each other on a second dielectric layer of the lower cover region, and lengths of the first dummy electrode and the fourth dummy electrode, measured in a length direction extending from the third surface to the fourth surface, are the same as lengths, measured in the length direction, of the first internal electrode and the second internal electrode, respectively, and lengths of the second dummy electrode and the third dummy electrode are the same as lengths of the first auxiliary electrode and the second auxiliary electrode, respectively.

2. The multilayer capacitor of claim 1, wherein the thickness of each second dielectric layer is equal to 20% to 60% of the thickness of each of the first dielectric layers.

3. The multilayer capacitor of claim 1, wherein a thickness of each of the upper and lower cover regions is 100 μm or more.

4. The multilayer capacitor of claim 1, wherein the upper cover region further includes an upper margin portion disposed on an upper surface of an uppermost dummy electrode, including a plurality of dielectric layers, and free of any electrodes therebetween, and the lower cover region further includes a lower margin portion disposed on a lower surface of a lowermost dummy electrode, including a plurality of dielectric layers, and free of any electrodes therebetween.

5. The multilayer capacitor of claim 1, wherein a length of each of the first and second internal electrodes is greater than a length of each of the first and second auxiliary electrodes.

6. The multilayer capacitor of claim 1, wherein the capacitor body includes a first surface and a second surface opposing each other, the third surface and the fourth surface connecting the first and second surfaces and opposing each other, and a fifth surface and a sixth surface connecting the first and second surfaces, connecting the third and fourth surfaces, and opposing each other, one end of each of the first and second internal electrodes is exposed through a respective one of the third and fourth surfaces, one end of each of the first and second auxiliary electrodes is exposed through a respective one of the fourth and third surfaces, and one end of each of the two dummy electrodes is exposed through one of the third and fourth surfaces.

7. The multilayer capacitor of claim 1, wherein in the upper cover region, the first dummy electrode and the second dummy electrode are provided as a plurality of first dummy electrodes and second dummy electrodes each disposed on a respective second dielectric layer and separated from other first and second dummy electrodes by second dielectric layers interposed therebetween, and in the lower cover region, the third dummy electrode and the fourth dummy electrode are provided as a plurality of third dummy electrodes and fourth dummy electrodes each disposed on a respective second dielectric layer and separate from other third and fourth dummy electrodes by second dielectric layers interposed therebetween.

8. A multilayer capacitor comprising: a body including a plurality of first dielectric layers, first and second internal electrodes alternately stacked to overlap with each other and having the first dielectric layers interposed therebetween, and upper and lower cover portions each including a plurality of second dielectric layers and respectively disposed above the uppermost internal electrode and below the lowermost internal electrode of the first and second internal electrodes; and first and second external electrodes disposed on one or more external surfaces of the body and respectively connected to the first and second internal electrodes, wherein the second dielectric layers of the upper and lower cover portions each have a thickness less than a thickness of each of the first dielectric layers, each first dielectric layer of the plurality of first dielectric layers having the first internal electrode thereon further includes a first auxiliary electrode connected to the second external electrode, and each first dielectric layer of the plurality of first dielectric layers having the second internal electrode thereon further includes a second auxiliary electrode connected to the first external electrode, the upper and lower cover portions each include, on each second dielectric layer of the plurality of second dielectric layers, first and second dummy electrodes respectively connected to the first and second external electrodes and spaced apart from other first and second dummy electrodes by second dielectric layers of the plurality of second dielectric layers, the first dummy electrodes of the upper cover portion, connected to the first external electrode, have a same length as the first internal electrodes, and the second dummy electrodes of the upper cover portion, connected to the second external electrode, have a same length as the first auxiliary electrodes, and the first dummy electrodes of the lower cover portion, connected to the first external electrode, have a same length as the second auxiliary electrodes, and the second dummy electrodes of the lower cover portion, connected to the second external electrode, have a same length as the second internal electrodes.

9. The multilayer capacitor of claim 8, wherein the second dielectric layers of the upper and lower cover portions each have the thickness of between 20% and 60% of the thickness of the first dielectric layers.

10. The multilayer capacitor of claim 8, wherein the upper and lower cover portions each include, on each second dielectric layer of the plurality of second dielectric layers, first and second dummy electrodes respectively connected to the first and second external electrodes and spaced apart from other first and second dummy electrodes by second dielectric layers of the plurality of second dielectric layers.

11. The multilayer capacitor of claim 10, wherein the first and second dummy electrodes have a same length as each other measured in a length direction extending from a first external surface of the body on which the first internal electrodes are exposed to a second external surface of the body on which the second internal electrodes are exposed.

12. The multilayer capacitor of claim 10, wherein the first dummy electrodes of the upper cover portion, connected to the first external electrode, have a different length than first dummy electrodes of the lower cover portion, connected to the first external electrode.

* * * * *